(12) United States Patent
Takei

(10) Patent No.: US 10,148,338 B1
(45) Date of Patent: Dec. 4, 2018

(54) WIRELESS COMMUNICATION SYSTEM

(71) Applicant: Hitachi, Ltd., Chiyoda-ku, Tokyo (JP)

(72) Inventor: Ken Takei, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/928,987

(22) Filed: Mar. 22, 2018

(30) Foreign Application Priority Data

Aug. 24, 2017 (JP) ................................ 2017-160842

(51) Int. Cl.
*H04B 7/10* (2017.01)
*H04W 72/04* (2009.01)
*H01Q 21/24* (2006.01)

(52) U.S. Cl.
CPC .......... *H04B 7/10* (2013.01); *H04W 72/0453* (2013.01); *H01Q 21/245* (2013.01)

(58) Field of Classification Search
CPC ........ H04B 7/10; H04B 7/028; H01Q 21/245; H04K 1/08
See application file for complete search history.

(56) References Cited

U.S. PATENT DOCUMENTS

| 2013/0336417 A1* | 12/2013 | Takei | ...................... H04B 7/10 375/267 |
| 2016/0226571 A1 | 8/2016 | Takei | |
| 2016/0255499 A1 | 9/2016 | Takei | |

FOREIGN PATENT DOCUMENTS

| WO | WO 2012/120657 A1 | 9/2012 |
| WO | WO 2014/155470 A1 | 10/2014 |
| WO | WO 2015/056353 A1 | 4/2015 |

\* cited by examiner

*Primary Examiner* — Vineeta S Panwalkar
(74) *Attorney, Agent, or Firm* — Crowell & Moring LLP

(57) ABSTRACT

A wireless communication system is disclosed by which, in communication that uses rotationally polarized waves, the information transmission amount is increased to perform communication. A transmitter 101 transmits a signal using polarized waves that are different at different timings using a rotationally polarized wave. In a receiver 201, a reception baseband circuit 20 detects different polarized waves received at timings corresponding to the polarized waves used by the transmitter 101 on a time axis using a plurality of signals equivalent to the received signals to obtain a wireless propagation characteristic between the transmitter 101 and the receiver 201. Then, the transmitter 101 propagates different signals in the form of a plurality of polarized waves at the same time using a plurality of rotationally polarized waves having initial polarization rotation phases different from each other. The transmission capacity can be increased by an amount corresponding to the number of different signals.

14 Claims, 12 Drawing Sheets

Transmitter

Transmitter

Transmitter

WIRELESS COMMUNICATION SYSTEM

BACKGROUND OF THE INVENTION

1. Field of the Invention

The present technology relates to a wireless communication system for transmitting information using a plurality of rotationally polarized waves.

2. Description of the Related Art

In wireless communication, since the transmission path is an open space and the transmission medium is an electromagnetic wave, a number of wireless communication systems equal to a number of different frequencies and independent of each other can operate in an open space.

Accordingly, it is important to effectively utilize finite frequency resources.

Here, in a wireless communication system, high reliability and high secure of information are requested.

In recent years, a transmission system by which a polarized wave is controlled using a new electromagnetic wave called rotationally polarized wave that rotates in a frequency lower than a propagation frequency to transmit information with high reliability and high secure is proposed in PCT Patent Publication Nos. WO 2012/120657, WO 2015/056353, and WO 2014/155470.

SUMMARY OF THE INVENTION

Incidentally, as penetration of the society by the wireless communication system proceeds, the number of users of the wireless communication system increases and the information amount to be transmitted by the wireless communication system is increasing.

In such a situation as just described, a technology for increasing the information transmission amount of the wireless communication system is demanded.

However, the technologies disclosed in PCT Patent Publication Nos. WO 2012/120657, WO 2015/056353, and WO 2014/155470 propose means for wirelessly transmitting information with high reliability and high secure using rotationally polarized waves, but do not disclose a technology for increasing the information transmission amount in a communication system in which rotationally polarized waves are used.

Therefore, in communication in which rotationally polarized waves, a technology by which the information transmission amount can be increased to perform communication is demanded.

It is an object of the present technology to implement a wireless communication system by which, in communication in which rotationally polarized waves are used, the information transmission amount is increased to perform communication.

In order to achieve the object described above, the present technology is configured in the following manner.

In particular, a wireless communication system includes a transmitter including a rotationally polarized wave generation unit that generates a plurality of rotationally polarized waves, an information signal generation unit that generates a plurality of information signals, an origination unit that multiplies the rotationally polarized waves and the information signals and originates results of the multiplication as origination signals, and a state changeover switch that performs changeover between a wireless channel acquisition state in which one of the plurality of information signals is multiplied by one of the plurality of rotationally polarized waves and a result of the multiplication is originated and a normal transmission state in which the plurality of information signals are multiplied by the plurality of rotationally polarized waves and results of the multiplication are originated, and a receiver including a reception unit that receives the origination signals from the transmitter, a weighting circuit unit that performs weighting for the signals received by the reception unit, and a reception baseband unit that regenerates the signals weighted by the weighting circuit unit into the information signals transmitted from the transmitter.

According to the technology, the wireless communication system can be implemented by which, in communication in which rotationally polarized waves are used, the information transmission amount can be increased to perform communication.

The above and other objects, features and advantages of the present invention will become apparent from the following description and the appended claims, taken in conjunction with the accompanying drawings in which like parts or elements denoted by like reference characters.

DESCRIPTION OF THE PREFERRED EMBODIMENT

In the following, an embodiment of the present technology is described with reference to the accompanying drawings.

Working Example 1

A working example 1 is an example of a configuration of a wireless communication system of the present technology that uses a plurality of rotationally polarized waves to increase the transmission capacity and is described with reference to FIG. 1.

Figure 1:
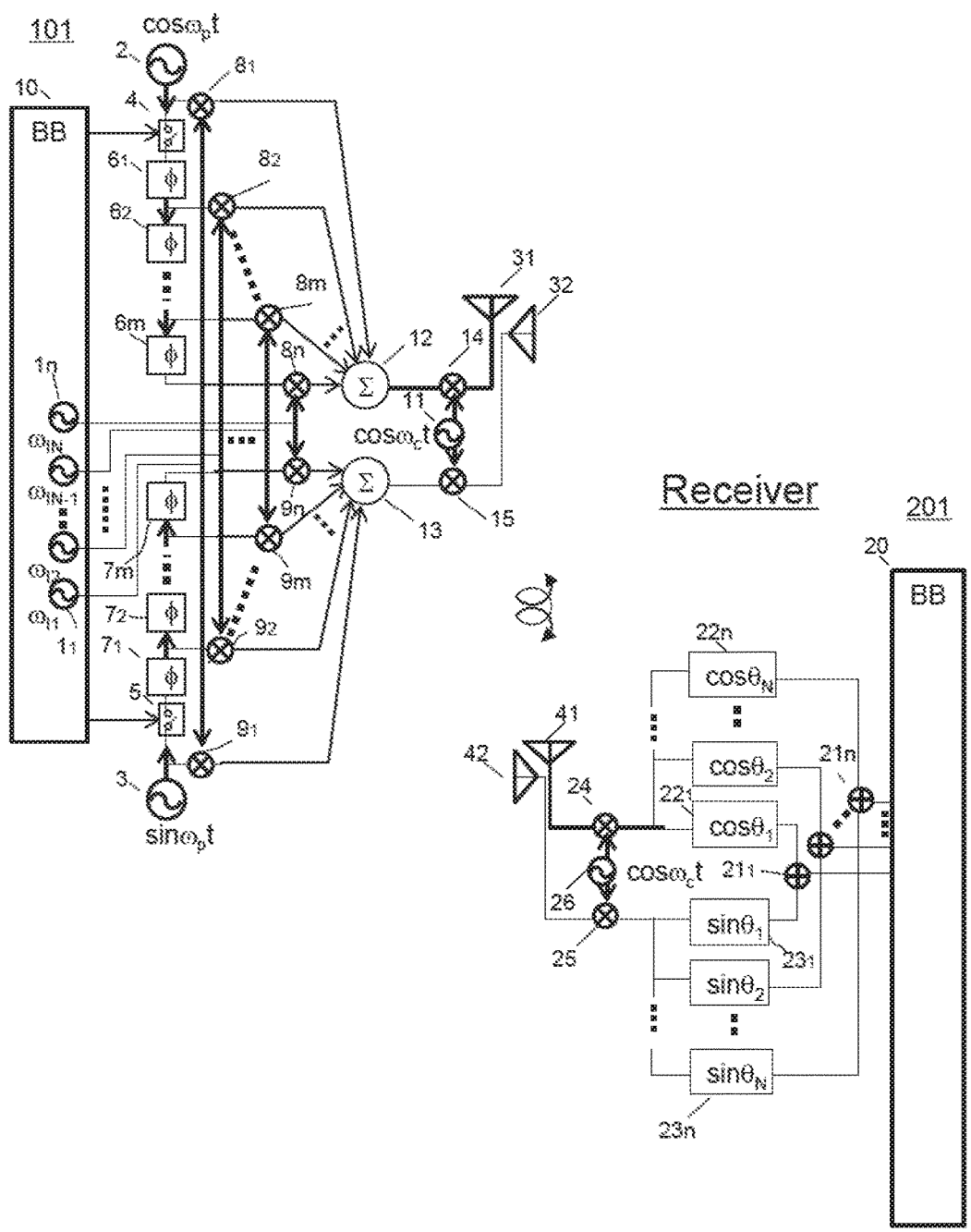
FIG. 1 is a block diagram of a wireless communication system in which a plurality of rotationally polarized waves are used to increase the transmission capacity in a working example 1 of the present technology.

FIG. 1 is a view depicting an example of a configuration of the wireless communication system in the working example 1 of the present technology in which a plurality of rotationally polarized waves are used to increase the transmission capacity.

Referring to FIG. 1, the wireless communication system 100 includes a transmitter 101 and a receiver 201. The transmitter 101 includes a first transmission antenna 31 that is spatially orthogonal and a second transmission antenna 32 that is spatially orthogonal to the first transmission antenna 31. Further, an output of a rotational polarization frequency cosine wave generator 2 is branched, and the output of one of the branches is inputted to a first cosine-based multiplier 81 from among a plurality of cosine-based multipliers 8.

The output of the other one of the branches from the output of the rotational polarization frequency cosine wave generator 2 is inputted to a subordinate connection of a plurality of cosine-based delay circuits 6 (to a series connection $6_1$ to $6_m$ of the plurality of cosine-based delay circuits 6) through a cosine-based switch 4.

An output of a rotational polarization frequency sine wave generator 3 is branched, and the output of one of the branches is inputted to a first sine-based multiplier 91 from among a plurality of sine-based multipliers 9.

The output of the other one of the branches from the output of the rotational polarization frequency sine wave generator 3 is inputted to a subordinate connection of a plurality of sine-based delay circuits 7 (to a series connection $7_1$ to $7_m$ of the plurality of sine-based delay circuits 7) through a sine-based switch 5.

By the delay circuits $6_1$ to $6_m$ and $7_1$ to $7_m$, a plurality of rotationally polarized waves having initial phases different from each other and having a same frequency and a same direction of rotation are formed.

An output of the first generator $1_1$ from among the plurality of information signal generators 1 configured in a transmission baseband circuit 10 is branched into two, and the first branch is inputted to the first cosine-based multiplier $8_1$ while the second branch of the output of the first generator $1_1$ is inputted to the first sine-based multiplier $9_1$.

An output of the cosine-based switch 4 is branched every time it passes one of the cosine-based delay circuits $6_1$, $6_2$, ..., and one of the branches is inputted to a next cosine-based delay circuit while the other branch is inputted to one of inputs of one of the plurality of cosine-based multipliers $8_2$, ..., $8_m$. An output of the cosine-based delay circuit $6_m$ is not branched and is inputted to one of inputs of the cosine-based multiplier $8_n$.

To the other input of each of the cosine-based multipliers $8_2$, ..., $8_m$, a first branch output that is one of branches of an output of one of the plurality of information signal generators $1_2$ to $1_n$ is inputted. A plurality of information signals generated from the information signal generators $1_1$ to $1_n$ are delayed by different delay amounts from each other.

An output of a sine-based switch 5 is branched every time it passes one of the sine-based delay circuits $7_1$, $7_2$, ..., and one of the branches is inputted to a next sine-based delay circuit while the other branch is inputted to one of inputs of one of the plurality of sine-based multipliers $9_2$, ..., $9_m$. An output of the sine-based delay circuit $7_m$ is not branched and is inputted to one of inputs of the sine-based multiplier $9_n$.

To the other input of each of the sine-based multipliers $9_2$, ..., $9_m$, the second branch output that is one of branches of an output of one of the plurality of information signal generators $1_2$ to $1_n$ is inputted.

Multiplication outputs of the plurality of cosine-based multipliers $8_1$, ..., $8_n$ are all synthesized by a cosine-based synthesis circuit 12, and an output of a carrier wave generator 11 is superimposed on an output of the cosine-based synthesis circuit 12 by a cosine-based carrier wave multiplier 14 and radiated in a space from the first transmission antenna 31.

Multiplication outputs of the plurality of sine-based multipliers $9_1$, ..., $9_n$ are all synthesized by the sine-based synthesis circuit 13, and the output of the carrier wave generator 11 is superimposed on an output of a sine-based synthesis circuit 13 by a sine-based carrier wave multiplier 15 and is radiated in a space from the second transmission antenna 32.

The receiver 201 includes a first reception antenna 41 and a second reception antenna 42 that is spatially orthogonal to the first reception antenna 41. An output of the first reception antenna 41 is multiplied by an output of a local oscillator 26 by a cosine-based local mixer 24 so as to be down converted into an output in a polarization rotation frequency band of the rotationally polarized wave. The down converted output is branched into a plurality of branch outputs, which are individually supplied to a plurality of cosine weighting circuits $22_1$ to $22_n$ such that they are individually weighted with cosine values of the phase angles different from each other.

An output of the second reception antenna 42 is multiplied by an output of the local oscillator 26 by a sine-based local mixer 25 so as to be down converted into an output in the polarization rotation frequency band of the rotationally polarized wave. The down converted output is branched into a plurality of branch outputs, which are individually supplied to a plurality of sine weighting circuits $23_1$ to $23_n$ such that they are individually weighted with sine values of the phase angles different from each other.

From among outputs of the cosine weighting circuits $22_1$ to $22_n$ and outputs of the sine weighting circuits $23_1$ to $23_n$, those outputs that have equal phase angles to each other are synthesized by the reception synthesis circuits $21_1$ to $21_n$ and are individually inputted to a reception baseband circuit (reception baseband circuit unit) 20.

In the wireless communication system according to the working example 1 of the present technology, in the transmitter 101, the cosine-based switch 4 and the sine-based switch 5 are switched off under the control of the transmission baseband circuit 10. Consequently, only an output of the first information signal generator $1_1$ among the plurality of information signal generators 1 is transmitted to the first transmission antenna 31 and he second transmission antenna 32 through the first cosine-based multiplier $8_1$, the first sine-based multiplier $9_1$, cosine-based synthesis circuit 12, sine-based synthesis circuit 13, cosine-based carrier wave multiplier 14 and sine-based carrier wave multiplier 15 to transmit the rotationally polarized waves.

In the receiver 201, reception outputs of the two antennae 41 and 42 that are spatially orthogonal to each other are branched, after passing through the cosine-based local mixer 24 and the sine-based local mixer 25, respectively. Then, the branched outputs are weighted by the cosine weighting circuits $22_1$ to $22_n$ and the sine weighting circuits $23_1$ to $23_n$ and then synthesized by reception synthesis circuits $21_1$ to $21_n$, respectively. Consequently, the outputs of the two antennae 41 and 42 orthogonal to each other are weighted synthesized. Then, the receiver 201 generates an output when arriving signals are received in the form of a plurality of polarized waves and inputs the generated output to a reception baseband circuit 20.

Since the transmitter 101 transmits signals using rotationally polarized waves, the signals are transmitted using different polarized waves at different timings. The reception baseband circuit 20 detects, using a plurality of signals equivalent to the signals received in the form of different polarized waves by the receiver 201, the received signals at timings corresponding to the polarized waves used by the transmitter 101 on the time axis. By this detection, the wireless transmission quality (wireless propagation characteristic) between the transmitter 101 and the receiver 201 when the transmitter 101 and the receiver 201 perform communication with polarization waves different from each other can be known.

In other words, a wireless channel when the transmitter 101 and the receiver 201 perform wireless communication with different polarization waves can be obtained. By using this wireless channel, in the case where the transmitter 101 switches on the cosine-based switch 4 and the sine-based switch 5 to transmit different signals with different polarization waves at the same time, the receiver 201 can separate the transmitted different signals and reproduce the information signals transmitted from the transmitter 101 by the reception baseband circuit 20. An operation for causing the transmitter 101 to transmit different signals with different polarization waves at the same time can be implemented by superimposing, using a plurality of rotationally polarized waves that are different in initial phase of different polarization rotations, different signals individually on the plurality of rotationally polarized waves and then radiating the plurality of different rotationally polarized waves simultaneously from the transmission antennae 31 and 32.

In this manner, from reception signals by a plurality of polarized waves at different timings within one cycle of a polarization rotation of the reception signals electrically implemented by the receiver 201, wireless propagation characteristics regarding all combinations of the polarized waves used by the transmitter 101 and the receiver 201 can be obtained.

After the wireless propagation characteristics are obtained, the transmitter 101 can propagate different signals with a plurality of polarized waves simultaneously using a plurality of rotationally polarized waves having different initial polarization rotation phases. Thus, the receiver 201 can separate and reproduce different signals transmitted simultaneously by the transmitter 101 using signals obtained from different polarization waves by the receiver 201 and wireless propagation characteristics obtained already with regard to the polarization waves used by the transmitter 101 and the receiver 201. Consequently, the transmission capacity can be increased by the number of different signals.

To an external apparatus other than the transmitter 101 and the receiver 201, a plurality of signals transmitted by the transmitter 101 come in a mixed state, and since the wireless propagation characteristics obtained by the transmitter 101 and the receiver 201 rely upon absolute positions of the transmitter 101 and the receiver 201, it is impossible for the external apparatus to obtain the wireless characteristics. Therefore, the external apparatus cannot separate the mixed signals, and as a result, an effect of confidential transmission of information to an outside person can be obtained.

As described above, with the working example 1 of the present technology, since a plurality of signals different from each other can be transmitted simultaneously using different rotationally polarized waves, the information transmission amount of wireless communication in which rotationally polarized waves are used can be increased. Thus, in communication in which rotationally polarized waves are used, it is possible to increase the information transmission amount to perform communication, and besides, it is possible to implement a wireless communication system whose confidentiality of information to be transferred can be improved.

Here, a rotationally polarized wave generation unit is configured from the rotational polarization frequency cosine wave generator 2, rotational polarization frequency sine wave generator 3, cosine-based switch 4, sine-based switch 5, cosine-based delay circuits $6_1$ to $6_m$ and series connection $7_1$ to $7_m$ of the sine-based delay circuits 7.

Further, each of the cosine-based switch 4 and the sine-based switch 5 is configured as a state changeover switch for performing changeover between a wireless channel acquisition state in which one of a plurality of information signals is multiplied by one rotationally polarized wave from among a plurality of rotationally polarized waves and is originated and a normal transmission state in which the plurality of information signals are multiplied by the plurality of rotationally polarized waves and are originated.

Further, the transmission baseband circuit 10 includes an information signal generator (in the case of the working example 1, the information signal generators $1_1$ to $1_n$).

Further, an origination unit is configured from the cosine-based multipliers $8_1$, . . . , $8_n$, plurality of sine-based multipliers $9_1$, . . . , $9_n$, carrier wave generator 11, cosine-based synthesis circuit 12, sine-based synthesis circuit 13, cosine-based carrier wave multiplier 14, sine-based multiplier 15, first transmission antenna 31 and second transmission antenna 32.

Further, a reception unit is configured from the cosine-based local mixer 24, sine-based local mixer 25, local oscillator 26, first reception antenna 41 and second reception antenna 42, and a weighting circuit unit is configured from the cosine weighting circuits $22_1$ to $22_n$, sine weighting circuits $23_1$ to $23_n$ and reception synthesis circuits $21_1$ to $21_n$.

Working Example 2

Now, a wireless communication system according to a working example 2 of the present technology is described.

Figure 2:
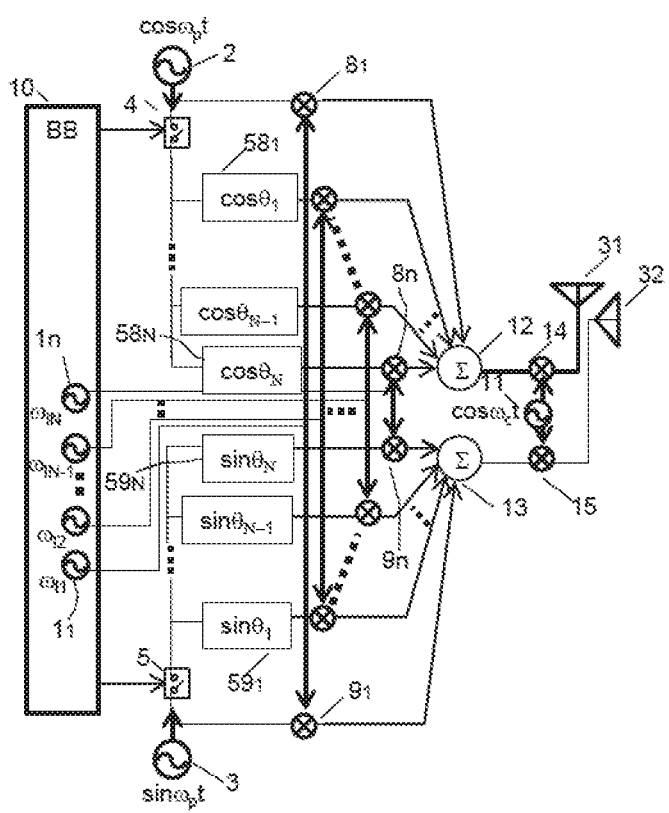
FIG. 2 is a block diagram of a transmitter in a wireless communication system according to a working example 2 of the present technology.

FIG. 2 is a block diagram of a transmitter 102 in the wireless communication system according to the working example 2 of the present technology. Also the working example 2 of the present technology is an example of a transmitter of the wireless communication system that increases the transmission capacity using a plurality of rotationally polarized waves similarly to the working example 1.

The difference between the transmitter 101 depicted in FIG. 1 and the transmitter 102 depicted in FIG. 2 resides in that the example in FIG. 2 includes a plurality of transmission cosine weighting circuits $58_1$ to $58_N$ connected in parallel, which are disposed in place of the series connection $6_1$ to $6_m$ of the plurality of cosine-based delay circuits 6 in the example of FIG. 1 and that the example in FIG. 2 includes a plurality of transmission sine weighting circuits $59_1$ to $59_N$ connected in parallel, which are disposed in place of the series connection $7_1$ to $7_m$ of the plurality of sine-based delay circuits 7 in the example of FIG. 1. In the working example 2, the receiver has a configuration similar to that of the receiver 201 depicted in FIG. 1, and therefore, depiction and detailed description of the receiver are omitted.

Referring to FIG. 2, the transmitter 102 includes a first transmission antenna 31 that is spatially orthogonal and a second transmission antenna 32 that is spatially orthogonal to the first transmission antenna 31. An output of the rotational polarization frequency cosine wave generator 2 is branched, and the output of one of the branches is inputted as one input to the first cosine-based multiplier $8_1$ from among the plurality of cosine-based multipliers 8 while the output of the other of the branches of the rotational polarization frequency cosine wave generator 2 is inputted in parallel to the plurality of transmission cosine weighting circuits $58_1$ to $58_N$ through a cosine-based switch 4.

Each of outputs of the plurality of transmission cosine weighting circuits $58_1$ to $58_N$ is inputted to one of inputs of a corresponding one of the plurality of cosine-based multipliers $8_2$ to $8_n$, and the other input of each of the cosine-based multipliers $8_1, \ldots, 8_n$ is a first branch where an output of a corresponding one of the plurality of information signal generators $1_1$ to $1_n$ is branched.

An output of a rotational polarization frequency sine wave generator 3 is branched, and the output of one of the branches is inputted as one input to a first sine-based multiplier $9_1$ from among a plurality of sine-based multipliers 9, and the output of the other branch of the rotational polarization frequency sine wave generator 3 is inputted in parallel to the plurality of transmission sine weighting circuits $59_1$ to $59_N$ through a sine-based switch 5.

An output of each of the plurality of transmission sine weighting circuits $59_1$ to $59_N$ is inputted to one of inputs of a corresponding one of the plurality of sine-based multipliers $9_2$ to $9_n$, and the other input of each of the sine-based multipliers $9_1, \ldots, 9_n$ is the second branch where the output of a corresponding one of the plurality of information signal generators $1_1$ to $1_n$ is branched.

The transmission cosine weighting circuits $58_1$ to $58_N$ and the transmission sine weighting circuits $59_1$ to $59_N$ have a paired relationship without excess such that they respectively have same phase angles, and multiplication outputs of the plurality of cosine-based multipliers $8_1$ to $8_n$ are all synthesized by a cosine-based synthesis circuit 12 and an output of a carrier wave generator 11 is superimposed on an output of the cosine-based synthesis circuit 12 by a cosine-based carrier wave multiplier 14 and is radiated in space from a first transmission antenna 31.

Multiplication outputs of the plurality of sine-based multipliers $9_1$ to $9_n$ are all synthesized by a sine-based synthesis circuit 13, and an output of the carrier wave generator 11 is superimposed on an output of the sine-based synthesis circuit 13 by a sine-based carrier wave multiplier 15 and is radiated in space from the second transmission antenna 32.

Also by the working example 2, similar advantageous effects to those by the working example 1 can be achieved.

In the working example 2, operation similar to that of the rotationally polarized light transmitter 101 of the working example 1 in FIG. 1 is executed without using a delay circuit. A delay circuit is expensive in comparison with a transmission cosine weighting circuit or a transmission sine weighting circuit and is greater in size, and therefore, the working example 2 can be reduced in cost and size in comparison with the working example 1. However, a transmission cosine weighting circuit and a transmission sine weighting circuit are complicated in control in comparison with a delay circuit.

Working Example 3

Now, a wireless communication system according to a working example 3 of the present technology is described.

Figure 3:
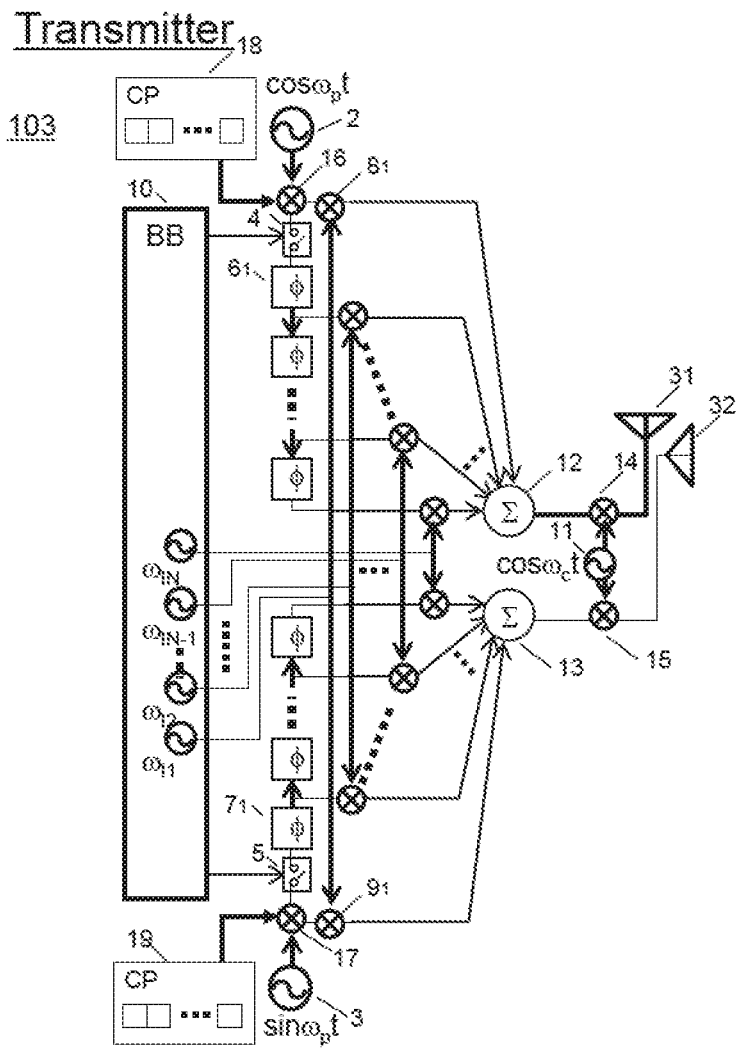
FIG. 3 is a block diagram of a transmitter in a wireless communication system according to a working example 3 of the present technology.
Figure 4:
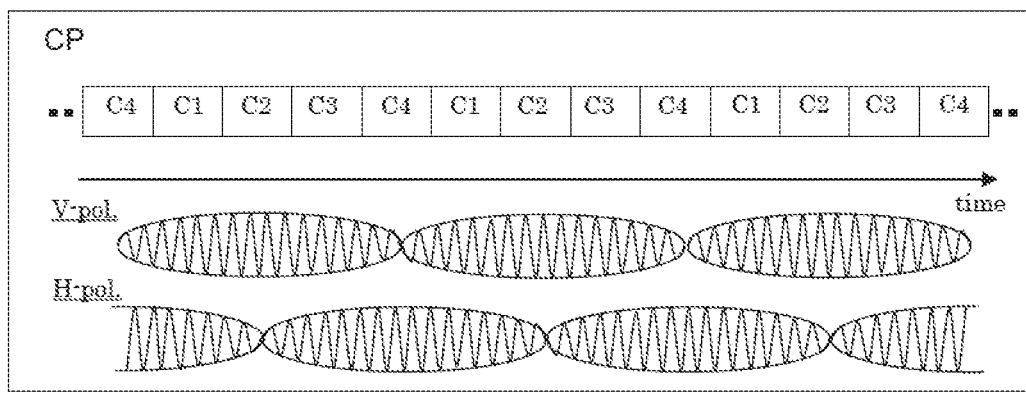
FIG. 4 is a diagrammatic view illustrating a polarization angle identification code.

FIG. 3 is a block diagram of a transmitter 103 in the wireless communication system according to the working example 3 of the present technology, and FIG. 4 is a view illustrating a polarization angle identification code. Also the working example 3 of the present technology is an example of a transmitter of the wireless communication system that uses a plurality of rotationally polarized waves to increase the transmission capacity similarly to the working example 1.

The difference between the transmitter 101 depicted in FIG. 1 and the transmitter 103 depicted in FIG. 3 resides in that the example in FIG. 3 includes a second transmission cosine-based multiplier 16, a polarization angle identification code generator 18, a second transmission sine-based multiplier 17 and another polarization angle identification code generator 19 in addition to the components of the example in FIG. 1. The configuration of the other part of the example in FIG. 3 is similar to that in the example in FIG. 1.

In the working example 3, the receiver has a configuration similar to that of the receiver 201 depicted in FIG. 1, and therefore, depiction and detailed description of the receiver are omitted.

Referring to FIG. 3, on outputs of the rotational polarization frequency cosine wave generator 2 and the rotational polarization frequency sine wave generator 3, outputs of the polarization angle identification code generators 18 and 19 having a same configuration are superimposed through the second transmission cosine-based multiplier 16 and the second transmission sine-based multiplier 17, respectively. As depicted in FIG. 4, codes generated by the polarization angle identification code generators 18 and 19 are configured such that one cycle of polarization rotation is divided equally and, to each of regions after the division, polarization angle identification codes CP that have strong autocorrelation characteristics and have weak cross correlation characteristics to each other are applied.

According to the working example 3, since the transmitter 103 uses a plurality of rotationally polarized waves, which are different from each other in an initial phase of polarization rotation, to transmit different information signals, different signals transmitted by a plurality of polarized waves at the same time are spread by different partial codes of a polarization angle identification signal. Therefore, the receiver can separate different signals from each other using codes at a same part.

Therefore, with the working example 3, similar advantageous effects to those by the working example 1 are achieved. Further, since the accuracy in separation of different signals transmitted using different polarized waves at the same time by the transmitter 103 is improved, the interference of different signals in the receiver can be reduced. Consequently, there is an advantageous effect that the communication quality when the transmission capacity of wireless communication is increased is improved.

Working Example 4

Now, a wireless communication system according to a working example 4 of the present technology is described.

Figure 5:
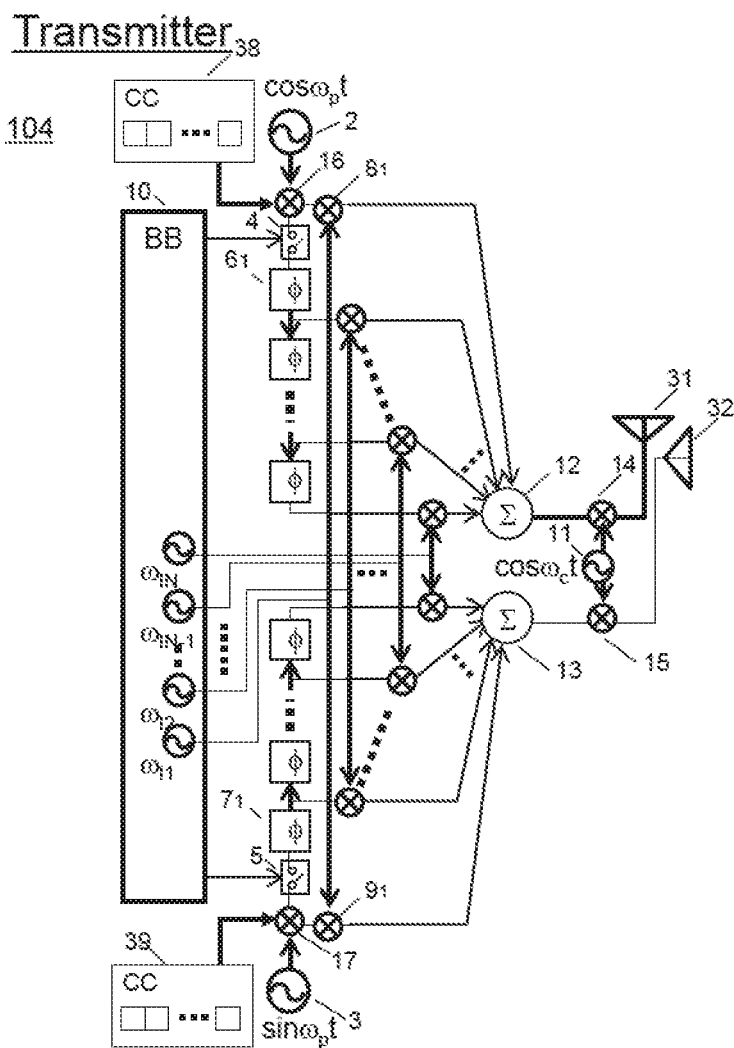
FIG. 5 is a block diagram of a transmitter in a wireless communication system according to a working example 4 of the present technology.
Figure 6:
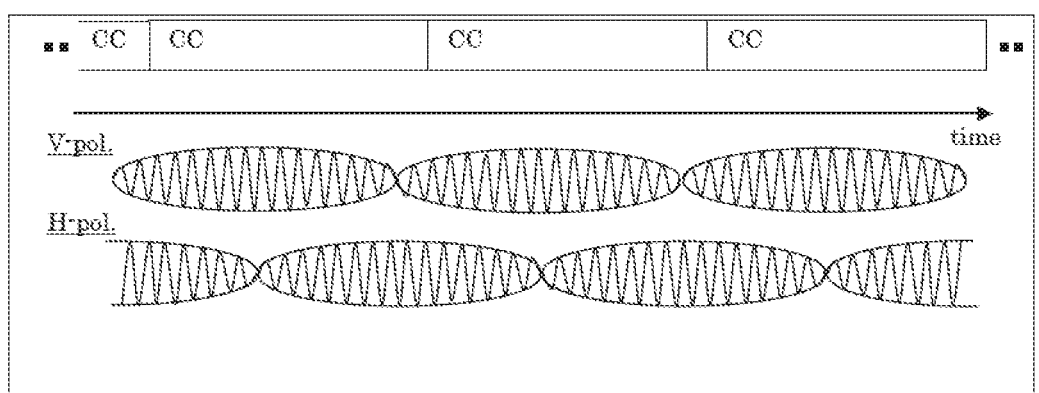
FIG. 6 is a diagrammatic view of a polarization rotation period cyclic code.

FIG. 5 is a block diagram of a transmitter 104 in the wireless communication system according to the working example 4 of the present technology. FIG. 6 is a diagrammatic view of a polarization rotation period cyclic code. Also the working example 4 of the present technology is an example of a transmitter of the wireless communication system that uses a plurality of rotationally polarized waves to increase the transmission capacity similarly to the working example 1.

The difference between the transmitter 101 depicted in FIG. 1 and the transmitter 104 depicted in FIG. 5 resides in that the example in FIG. 5 includes a second transmission cosine-based multiplier 16, a polarization rotation period cyclic code generator 38, a second transmission sine-based multiplier 17 and another polarization rotation period cyclic code generator 39 in addition to the components of the example in FIG. 1. The configuration of the other part of the transmitter 104 is similar to that of the example of FIG. 1.

In the working example 4, the receiver has a configuration similar to that of the receiver 201 depicted in FIG. 1, and therefore, depiction and detailed description of the receiver are omitted.

Referring to FIG. 5, on outputs of the rotational polarization frequency cosine wave generator 2 and the rotational polarization frequency sine wave generator 3, outputs of the polarization rotation period cyclic code generators 38 and 39 having a same configuration are superimposed through the second transmission cosine-based multiplier 16 and the second transmission sine-based multiplier 17, respectively. As depicted in FIG. 6, as codes CC generated by the polarization rotation period cyclic code generators 38 and 39, those codes that have a code period same as the period of polarization rotation and have a strong autocorrelation characteristic are used.

With the working example 4, since the transmitter 104 uses a plurality of rotationally polarized waves, which are different from each other in an initial phase of polarization rotation, to transmit different information signals, different signals transmitted by a plurality of polarized waves at the same time are spread by cyclic codes of different initial phases of a polarization angle identification signal. Therefore, the receiver can separate different signals from each other using the cyclic codes.

Therefore, with the working example 4, similar advantageous effects to those by the working example 1 are achieved. Further, since the accuracy in separation of different signals transmitted using different polarized waves at the same time by the transmitter 104 is improved, the interference of different signals in the receiver can be reduced. Consequently, there is an advantageous effect that the communication quality when the transmission capacity of wireless communication is increased is improved.

Working Example 5

Now, a wireless communication system according to a working example 5 of the present technology is described.

Figure 7:
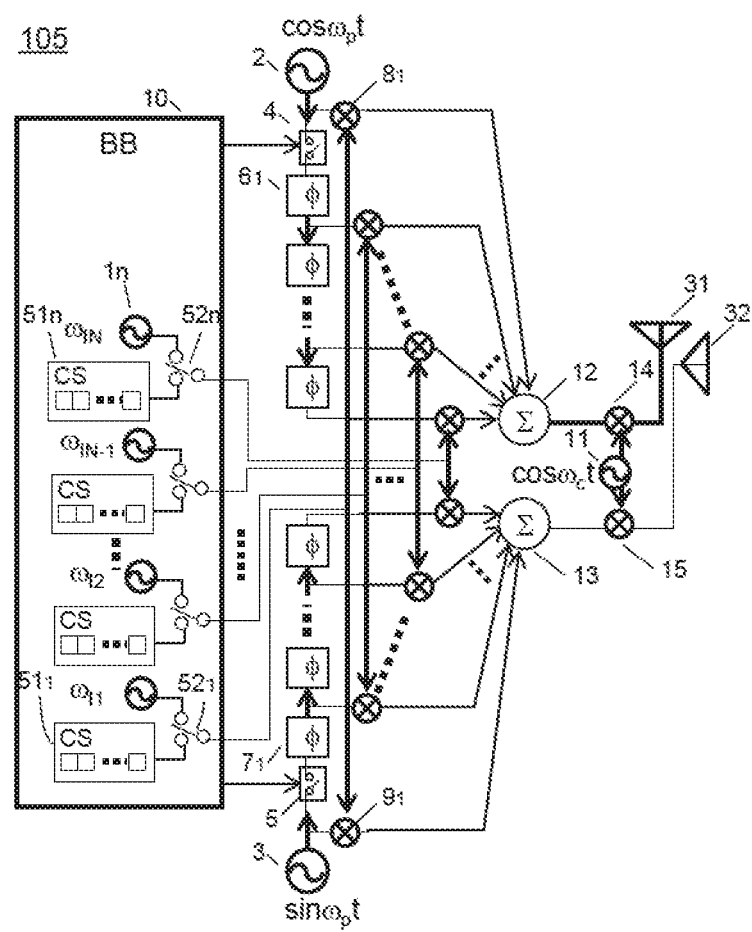
FIG. 7 is a block diagram of a transmitter in a wireless communication system according to a working example 5 of the present technology.

FIG. 7 is a block diagram of a transmitter 105 in the wireless communication system according to the working example 5 of the present technology. Also the working example 5 of the present technology is an example of a transmitter of the wireless communication system that uses a plurality of rotationally polarized waves to increase the transmission capacity similarly to the working example 1.

The difference between the transmitter 101 depicted in FIG. 1 and the transmitter 105 depicted in FIG. 7 resides in that the example in FIG. 7 includes synchronization code generation circuits $51_1$ to $51_n$ and changeover circuits $52_1$ to $52_n$, which are additionally provided to the components of the example in FIG. 1. The configuration of the other part of the transmitter 105 is similar to that of the example of FIG. 1.

In the working example 5, the receiver has a configuration similar to that of the receiver 201 depicted in FIG. 1, and therefore, depiction and detailed description of the receiver are omitted.

In FIG. 7, the transmission baseband circuit 10 uses a plurality of changeover circuits $52_1$ to $52_n$ to change over a signal to be transmitted between an information signal from the information signal generators $1_1$ to $1_n$ and a synchronization code from the synchronization code generation circuits $51_1$ to $51_n$. For the synchronization code, a synchronization code having a very strong autocorrelation characteristic is used.

With the present working example 5, similar advantageous effects to those by the working example 1 are achieved. Further, since it becomes possible for the receiver to establish synchronism with a transmission timing of the transmitter 105 using a synchronization code, there is an advantageous effect in improvement of the communication quality in wireless communication. Further, an advantageous effect can be achieved that separation accuracy of signals transmitted from the transmitter 105 and different from each other can be improved.

Working Example 6

Now, a wireless communication system according to a working example 6 of the present technology is described.

Figure 8:
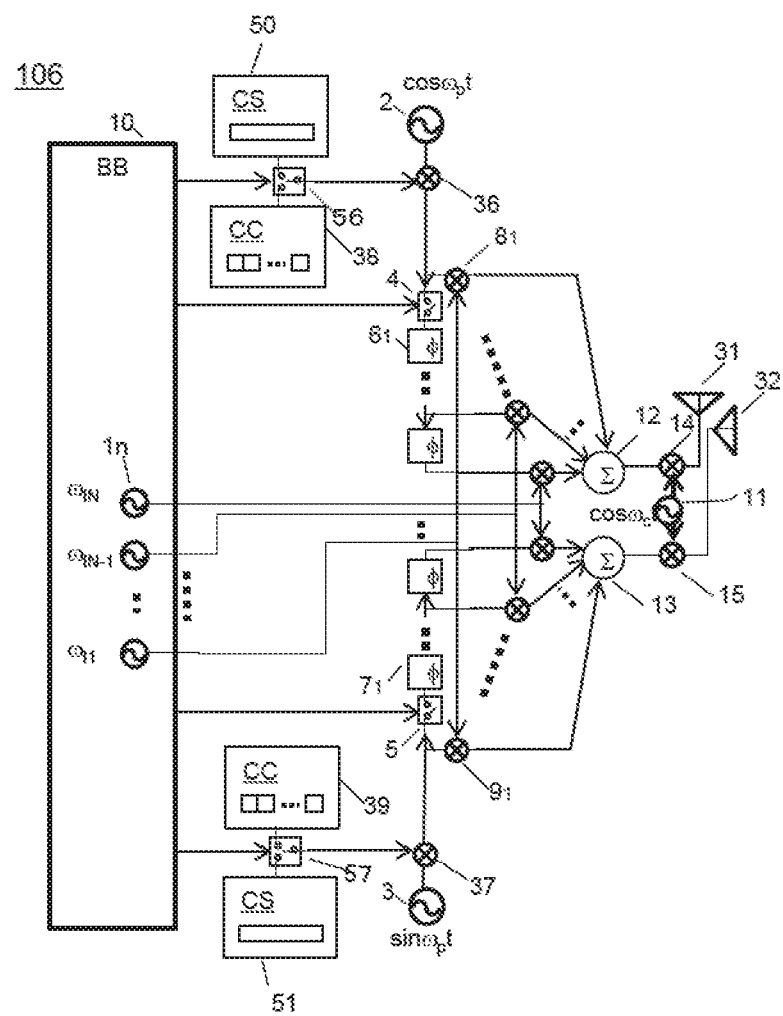
FIG. 8 is a block diagram of a transmitter in a wireless communication system according to a working example 6 of the present technology.

FIG. 8 is a block diagram of a transmitter 106 in the wireless communication system according to the working example 6 of the present technology. Also the working example 6 of the present technology is an example of a transmitter of the wireless communication system that uses a plurality of rotationally polarized waves to increase the transmission capacity similarly to the working example 1.

The difference between the transmitter 101 depicted in FIG. 1 and the transmitter 105 depicted in FIG. 8 resides in that the example in FIG. 8 includes a second transmission cosine-based multiplier 36, a second transmission sine-based multiplier 37, polarization rotation period cyclic code generators 38 and 39, synchronization code generation circuits 50 and 51, a second cosine-based switch 56 and a second sine-based switch 57, which are additionally provided to the components of the example in FIG. 1. The configuration of the other part of the transmitter 105 is similar to that of the example of FIG. 1.

In the working example 6, the receiver has a configuration similar to that of the receiver 201 depicted in FIG. 1, and therefore, depiction and detailed description of the receiver are omitted.

Referring to FIG. 8, the synchronization code generation circuits 50 and 51 having a same configuration are coupled to the polarization rotation period cyclic code generators 38 and 39 through the second cosine-based switch 56 and the second sine-based switch 57, respectively, and outputs of the polarization rotation period cyclic code generators 38 and 39 and the synchronization code generation circuits 50 and 51 are changed over by the transmission baseband circuit 10.

With the present working example 6, similar advantageous effects to those by the working example 1 are achieved. Further, the identification accuracy of signals by the receiver when the transmitter 106 transmits different signals at the same time using cyclic codes can be improved. Thus, by improving the synchronism accuracy with the receiver using synchronous codes, there is an advantageous effect that the identification accuracy of signals can be improved further.

Working Example 7

Now, a wireless communication system according to a working example 7 of the present technology is described.

Figure 9:
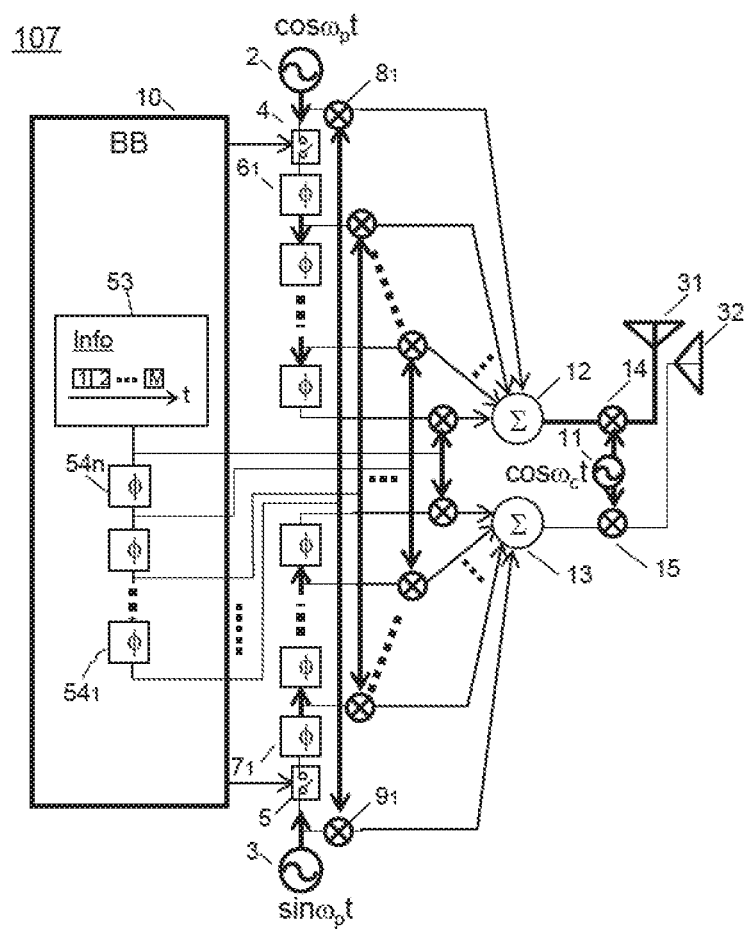
FIG. 9 is a block diagram of a transmitter in a wireless communication system according to a working example 7 of the present technology.

FIG. 9 is a block diagram of a transmitter 107 in the wireless communication system according to the working example 7 of the present technology. Also the working example 7 of the present technology is an example of a transmitter of the wireless communication system that uses a plurality of rotationally polarized waves to increase the transmission capacity similarly to the working example 1.

The difference between the transmitter 101 depicted in FIG. 1 and the transmitter 107 depicted in FIG. 9 resides in that the example in FIG. 9 includes information delay circuits $54_1$ to $54_n$ and an information signal division generator 53, which are disposed in place of the plurality of information signal generators $1_1$ to $1_n$ of the transmission baseband circuit 10 in the example in FIG. 1. In the working example 7, the receiver has a configuration similar to that of the receiver 201 depicted in FIG. 1, and therefore, depiction and detailed description of the receiver are omitted.

Referring to FIG. 9, the information signal division generator 53 outputs an information signal to be transmitted divisionally for each same transmission time period such that the information signal is inputted to the information delay circuits $54_1$ to $54_n$ that are connected in subordinate connection. The information delay circuits $54_1$ to $54_n$ generate delays of an equal period of time to be used for information division by the information signal division generator 53.

Outputs of the plurality of information delay circuits $54_1$ to $54_n$ become sequential outputs of information divided for each fixed period of time by the information signal division generator 53 and are transmitted similarly to outputs of the plurality of information signal generators $1_1$ to $1_n$ of the transmitter 101 of FIG. 1.

With the working example 7 of the present technology, since same information is transmitted as a plurality of signals and is reproduced by the receiver, there is an advantageous effect in improvement in reliability of wireless communication. Further, since, at the same timing, portions into which the same information is divided are mixed and radiated in an external space, there is an advantageous effect that the substance of the information to be transmitted can be made confidential to outside parties.

Working Example 8

Now, a wireless communication system according to a working example 8 of the present technology is described.

Figure 10:
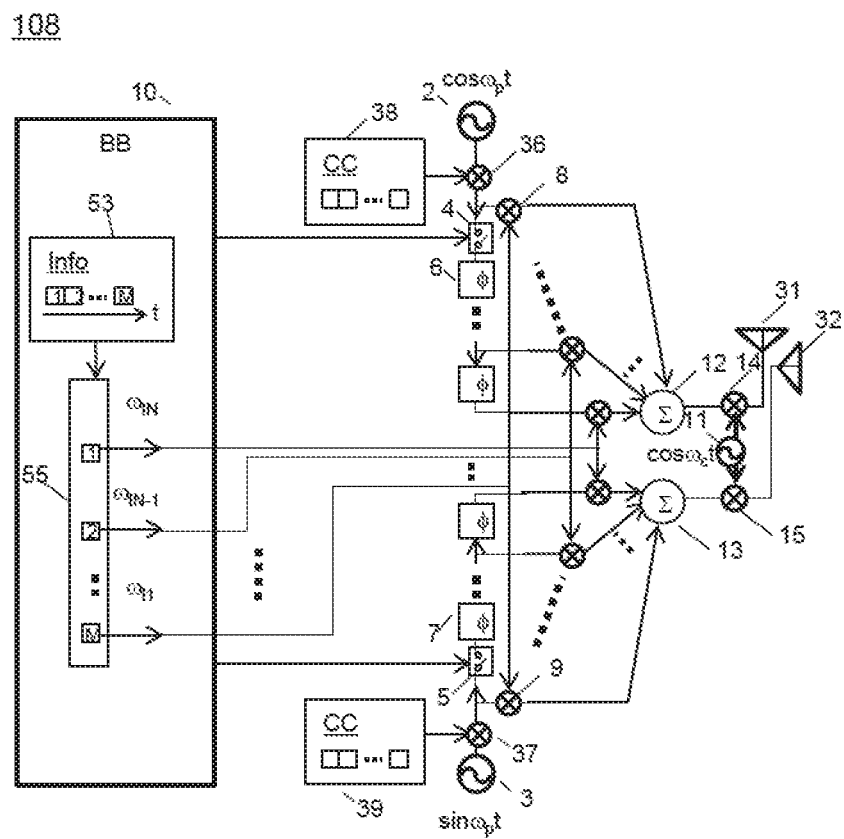
FIG. 10 is a block diagram of a transmitter in a wireless communication system according to a working example 8 of the present technology.

FIG. 10 is a block diagram of a transmitter 108 in the wireless communication system according to the working example 8 of the present technology. Also the working example 8 of the present technology is an example of a transmitter of the wireless communication system that uses a plurality of rotationally polarized waves to increase the transmission capacity similarly to the working example 1.

The difference between the transmitter 101 depicted in FIG. 1 and the transmitter 108 depicted in FIG. 10 resides in that the example in FIG. 10 includes a second transmission cosine-based multiplier 36, a polarization rotation period cyclic code generator 38, a second transmission sine-based multiplier 37 and another polarization rotation period cyclic code generator 39, which are provided in addition to the components of the example in FIG. 1, and the information signal generators $1_1$ to $1_n$ of the transmission baseband circuit 10 of FIG. 1 are replaced with an information signal division generator 53 and a digital serial to parallel conversion circuit 55 in the example in FIG. 10. The configuration of the other part of the transmitter 108 is similar to that of the example of FIG. 1.

In the working example 8, the receiver has a configuration similar to that of the receiver 201 depicted in FIG. 1, and therefore, depiction and detailed description of the receiver are omitted.

Referring to FIG. 10, outputs of the polarization rotation period cyclic code generators 38 and 39 having a same configuration are superimposed on outputs of the rotational polarization frequency cosine wave generator 2 and the rotational polarization frequency sine wave generator 3 through the second transmission cosine-based multiplier 36 and the second transmission sine-based multiplier 37, respectively. As codes CC generated by the polarization rotation period cyclic code generators 38 and 39, those codes that have a code period same as the period of polarization rotation and have a strong autocorrelation characteristic are used.

portions of an information signal into which the information signal is divided for each fixed period of time by the information signal division generator 53 of the transmission baseband circuit 10 are converted into parallel data by the digital serial to parallel conversion circuit 55, and the parallel data are transmitted similarly to the outputs of the plurality of information signal generators $1_1$ to $1_n$ of the transmitter 101 of FIG. 1.

Since the working example 8 uses the polarization rotation period cyclic code generators 38 and 39 similarly to the working example 4, interference of the different signals in the receiver can be reduced, and the communication quality when the transmission capacity of wireless communication is increased can be improved.

Further, in the working example 8, the same information can be transmitted in parallel as a plurality of signals, and the transmission capacity can be increased by the number of rotationally polarized waves to be used simultaneously in comparison with the working example 7. Besides, since, at the same timing, portions into which the same information is divided are mixed and radiated in an external space, there is an advantageous effect that the substance of the information to be transmitted can be made confidential to outside parties.

Working Example 9

Now, a wireless communication system according to a working example 9 of the present technology is described.

Figure 11:
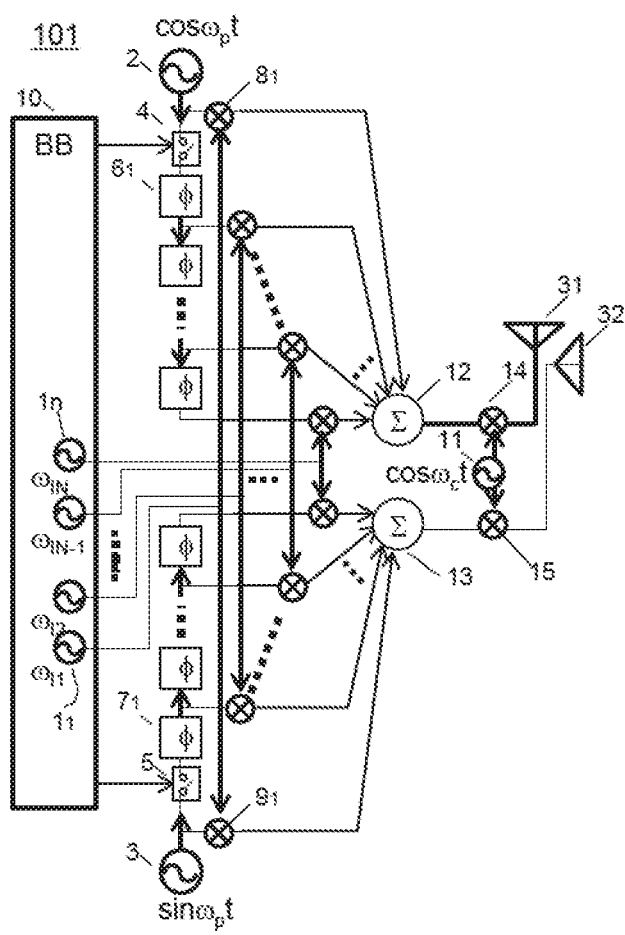
FIG. 11 is a block diagram of a transmitter in a wireless communication system according to a working example 9 of the present technology.
Figure 12:
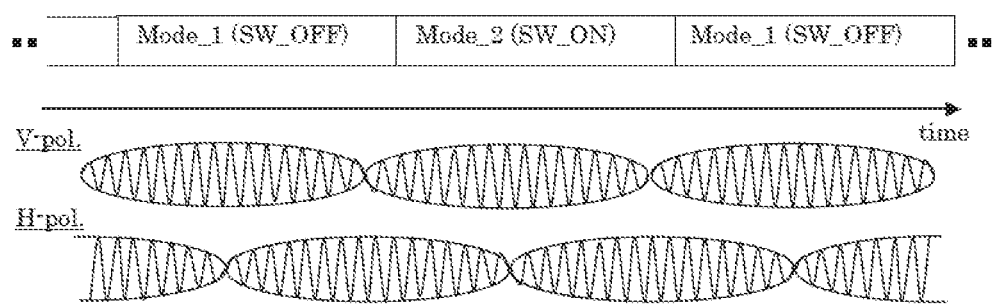
FIG. 12 is a diagrammatic view illustrating operation of the working example 9.

FIG. 11 is a block diagram of a transmitter 101 in the wireless communication system according to the working example 9 of the present technology, and FIG. 12 is a view illustrating operation of the working example 9. Also the working example 9 of the present technology is an example of a transmitter of the wireless communication system that uses a plurality of rotationally polarized waves to increase the transmission capacity similarly to the working example 1.

Although the transmitter 101 depicted in FIG. 1 and the transmitter 101 depicted in FIG. 11 have a same basic configuration, on-off operations of the switches 4 and 5 in the working example 9 are different from those in the working example 1. In the working example 9, the receiver has a configuration similar to that of the receiver 201 depicted in FIG. 1, and therefore, depiction and detailed description of the receiver are omitted.

The transmitter 101 in the working example 9 has a procedure for allowing a wireless channel to be obtained by the receiver and a procedure for transmitting different signals simultaneously using different rotationally polarized waves. In the former, the transmission baseband circuit 10 switches off the cosine-based switch 4 and the sine-based switch 5 such that only an output of the first information signal generator $1_1$ is transmitted with one rotationally polarized wave through the first transmission antenna 31 and the second transmission antenna 32 (mode 1 (switches off)). Then, in the latter, both switches 4 and 5 are switched on such that a plurality of different signals can be transmitted at the same time with a plurality of rotationally polarized waves different from each other (mode 2 (switches on)).

In the present working example 9, the former procedure is performed within one cycle of polarization rotation and the latter procedure is performed within a succeeding one cycle as depicted in FIG. 12, and the procedures are repeated in a unit of two cycles of polarization rotation. In other words, information signals generated by the transmission baseband circuit 10 that is an information signal generation unit are transmitted by alternately executing both of the mode 1 in which one information signal is transmitted with a single rotationally polarized wave and the mode 2 in which a plurality of information signals are transmitted with a plurality of rotationally polarized waves within a period of time of an integer multiple of the cycle of polarization rotation.

The state changeover switch alternately performs changeover between the wireless channel acquisition state and the normal transmission state in a period of time of an integer multiple of the polarization rotation period.

With the present working example 9, similar advantageous effects to those by the working example 1 are achieved. Further, a wireless channel necessary for separating and reproducing different signals transmitted with different rotationally polarized waves can be updated every time in a cycle of polarization rotation. Therefore, there is an advantageous effect that the resistance of separation and reproduction operations to a change of the radio wave environments surrounding the transmitter and the receiver can be improved.

Working Example 10

Now, a wireless communication system according to a working example 10 of the present technology is described.

Figure 13:
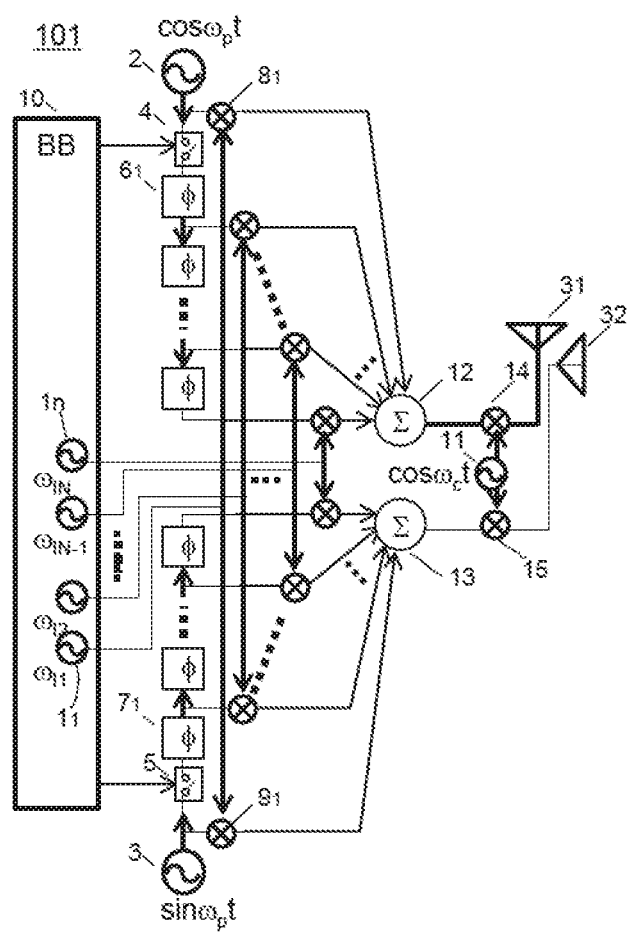
FIG. 13 is a block diagram of a transmitter in a wireless communication system according to a working example 10 of the present technology.
Figure 14:
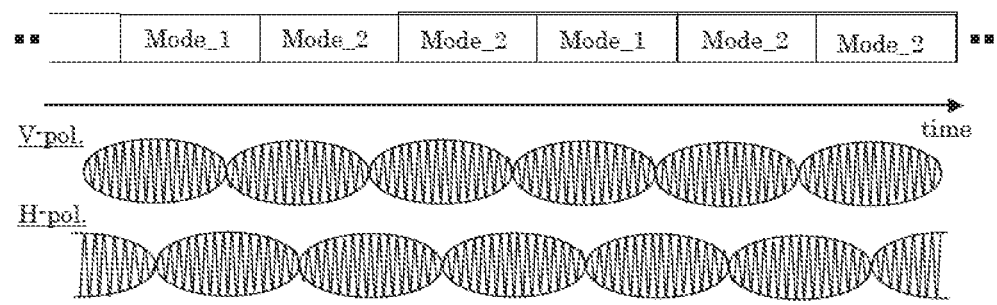
FIG. 14 is a diagrammatic view illustrating operation of the working example 10 of the present technology.

FIG. 13 is a block diagram of a transmitter 101 in the wireless communication system according to the working example 10 of the present technology, and FIG. 14 is a view illustrating operation of the working example 10 of the present technology. Also the working example 10 of the present technology is an example of a transmitter of the wireless communication system that uses a plurality of rotationally polarized waves to increase the transmission capacity similarly to the working examples 1 and 9.

Although the transmitter 101 in the working example 9 depicted in FIG. 11 and the transmitter 101 in the working example 10 depicted in FIG. 13 have a same basic configuration, on-off operations of the switches 4 and 5 in the working example 10 are different from those in the working example 9. Also in the working example 10, the receiver has a configuration similar to that of the receiver 201 depicted in FIG. 1, and therefore, depiction and detailed description of the receiver are omitted.

The difference between the working example 9 and the working example 10 resides in that, in the working example 10, as depicted in FIG. 14, after the procedure (switching off of the switches 4 and 5) for allowing the receiver to obtain a wireless channel is performed by the transmitter 101, the switches 4 and 5 are switched on such that the procedure for simultaneously transmitting different signals using different rotationally polarized waves is repeated continuously for a little while.

In particular, the switches 4 and 5 that are state changeover switches perform changeover between the wireless channel acquisition state and the normal transmission state such that they execute the wireless channel acquisition state in a period of time of an integer multiple of the polarization rotation period and then execute the normal transmission state in a period of time of an integer multiple of the polarization rotation period that is longer than the execution time period of the wireless channel acquisition state.

In the case where the wireless circumferences surrounding the transmitter and the receiver do not fluctuate significantly, it is considered that the time variation of wireless channels necessary to separate and reproduce different signals transmitted with different rotationally polarized waves by the receiver is small.

In the case where especially the system to which IoT is applied is an infrastructure system and strictly restricts access by an outside person, it is considered that such a situation as described above occurs. In the present working example 10, the transmitter 101 repeats, after procedure (mode 1) for allowing the receiver to obtain a wireless channel, the procedure (mode 2) for transmitting different signals at the same time using different rotationally polarized waves twice. There is no problem even if the latter procedure is repeated by an increasing number of times as the variation of the radio wave environment surrounding the transmitter and the receiver decreases.

With the present working example 10, similar advantageous effects to those by the working example 1 are achieved. Further, since the period of time within which different signals are transmitted simultaneously using different rotationally polarized waves can be increased, there is an advantageous effect that the transmission capacity of the wireless communication system in which rotationally polarized waves are used can be increased.

Working Example 11

Now, a wireless communication system according to a working example 11 of the present technology is described.

Figure 15:
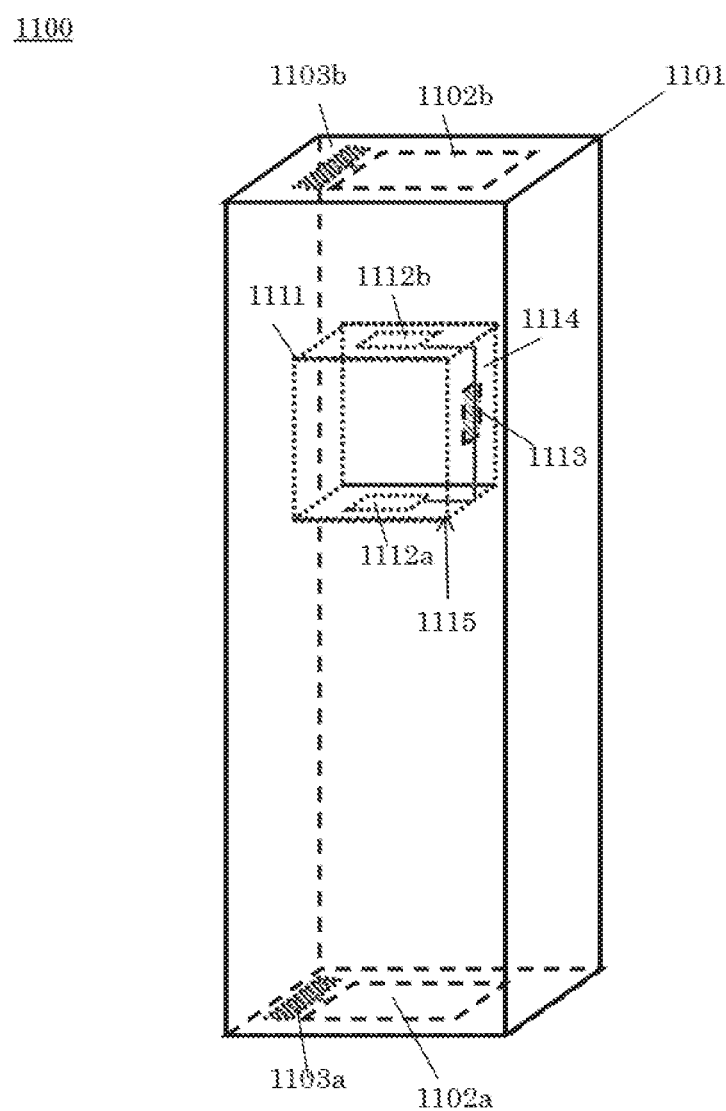
FIG. 15 is a schematic view depicting a configuration of an elevator system to which a wireless communication system according to a working example 11 of the present technology in which a transmission path formed between a transmitter and a receiver using rotationally polarized waves is selected to transmit information is applied.

FIG. 15 is a schematic view depicting a configuration of an elevator system to which a wireless communication system that selects a propagation path formed between a transmitter and a receiver using rotationally polarized waves to transmit information according to the working example 11 of the present technology.

Referring to FIG. 15, in the elevator system 1100 of the present working example 11, a lift cage 1111 moves up and down in the inside of a building 1101 in which an elevator 1115 is installed. On the floor of the inside of the building 1101, a base station transceiver 1103a is disposed and includes a transmitter and a receiver of the wireless communication system of the present technology that selects a propagation path formed between the transmitter and the receiver using rotationally polarized waves to transmit information. On the ceiling of the inside of the building 1101, another base station transceiver 1103b is disposed and includes a transmitter and a receiver of the wireless communication system according to the present technology.

Further, on the floor of the building 1101, a base station 2 orthogonal polarized wave integrated antenna 1102a is installed in a coupled state to the base station transceiver 1103a, and on the ceiling of the building 1101, another base station 2 orthogonal polarized wave integrated antenna 1102b is installed in a coupled state to the base station transceiver 1103b.

Meanwhile, on the outer side of the ceiling of the lift 1111, a terminal station 2 orthogonal polarized wave integrated antenna 1112b is installed such that it is coupled to a terminal transceiver 1113 that includes a transmitter and a receiver of the wireless communication system of the present technology that selects a transmission path formed between the transmitter and the receiver using rotationally polarized waves. The terminal station 2 orthogonal polarized wave integrated antenna 1112b is coupled to the terminal transceiver 1113 using a high frequency cable 1114.

Further, on the outer side of the floor of the lift cage 1111, another terminal station 2 orthogonal polarized wave integrated antenna 1112a is installed such that it is coupled to the terminal transceiver 1113. The terminal station 2 orthogonal polarized wave integrated antenna 1112a is coupled to the terminal transceiver 1113 using the high frequency cable 1114.

Since the base station transceivers 1103a and 1103b and the terminal transceiver 1113 use the inside of the building 1101 as a wireless transmission medium, electromagnetic waves undergo multiple reflection by an inner all of the building 1101 and an outer wall of the elevator 1115 thereby to form a multiple wave interference environment.

In the present working example 11, since a propagation path modification act from an outside person is detected under a multiple wave interference environment and wireless transmission of high quality by which degradation of the communication quality between the transmitter and the receiver is compensated for against the modification can be implemented, control and monitoring of the elevator 1111 can be carried out using wireless connection means, in which same transceivers are used, remotely from the building 1101. Consequently, wired connection means such as a cable can be deleted, and the same transportation capacity can be implemented by a smaller building volume, or improvement of the transportation capacity by increasing the elevator size in the same building volume can be implemented.

It is to be noted that, to the base station transceivers 1103a and 1103b and the terminal transceiver 1113, any of the transmitters and the receivers in the working examples 1 to 10 described hereinabove can be applied.

Working Example 12

Now, a wireless communication system according to a working example 12 of the present technology is described.

Figure 16:
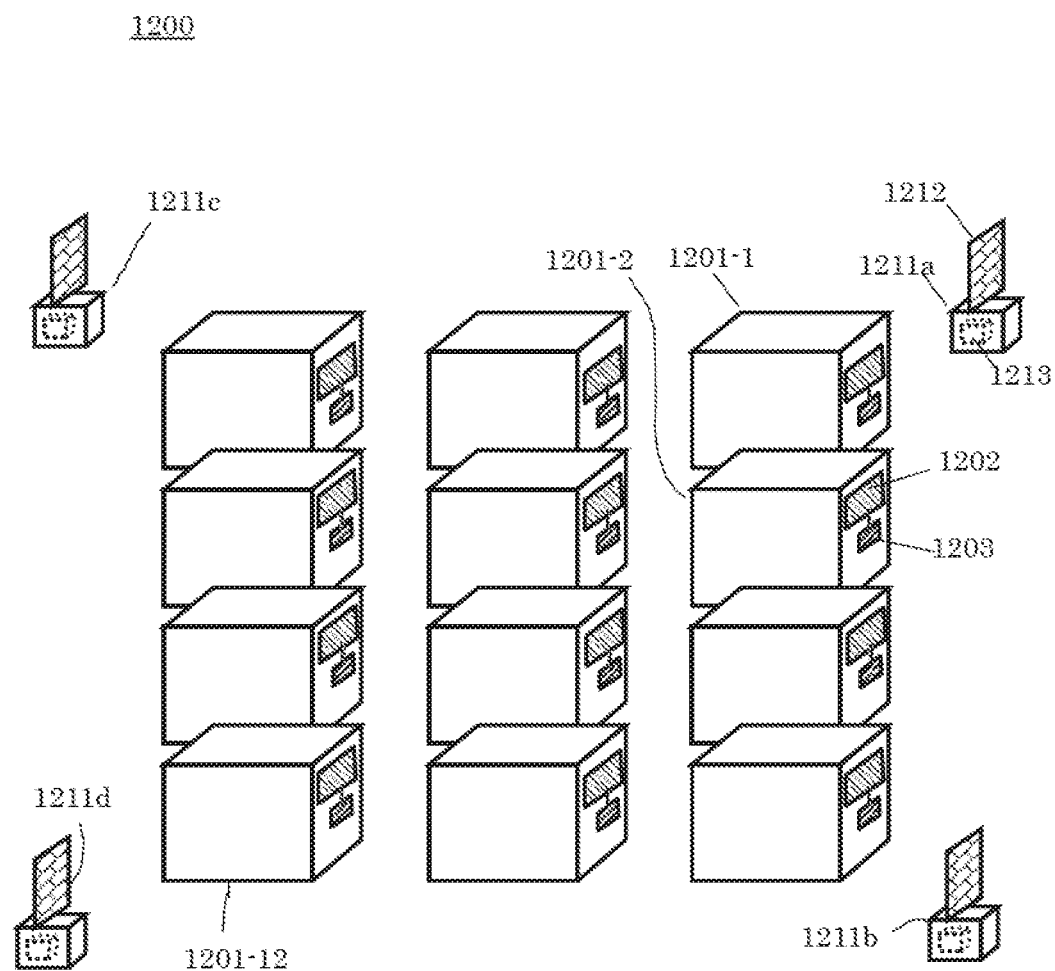
FIG. 16 is a schematic view depicting a configuration of a substation equipment monitoring system to which a wireless communication system according to a working example 12 of the present technology in which a transmission path formed between a transmitter and a receiver using rotationally polarized waves is selected to transmit information is applied.

FIG. 16 is a schematic view depicting a configuration of a substation equipment monitoring system to which the wireless communication system according to a working example 12 of the present technology in which a transmission path formed between the transmitter and the receiver using rotationally polarized waves is selected to transmit information is applied.

Referring to FIG. 16, the substation equipment monitoring system 1200 of the present working example 12 includes a plurality of substation machines 1201-1 to 1201-12. In each of the plurality of substation machines 1201-1 to 1201-12, a terminal station transceiver 1203 and a terminal station rotationally polarized wave antenna 1202 are installed. The terminal station transceiver 1203 includes a transmitter and a receiver of the wireless communication system according to the present technology that selects a transmission path formed between the transmitter and the receiver using rotationally polarized waves to transmit information. The terminal station rotationally polarized wave antenna 1202 is coupled to the terminal station transceiver 1203.

Further, in the proximity of the substation machines 1201-1 to 1201-12, base station apparatus 1211a to 1211d are installed. Each of the base station apparatus 1211a to 1211d includes a transmitter and a receiver of the wireless communication system according to the present technology that selects a transmission path formed between the transmitter and the receiver using a plural number of rotationally polarized waves smaller than the number of substation machines 1201-1 to 1201-12 to transmit information.

In each of the base station apparatus 1211a to 1211d, an antenna 1212 that can transmit and receive a rotationally polarized wave and a base station transceiver 1213 that uses an electromagnetic wave of a rotationally polarized wave are installed in a coupled state to each other.

Each of the substation machines 1201-1 to 1201-12 has a size of the order of several m, which is overwhelmingly large in comparison with a wavelength corresponding to several hundred MHz to several GHz which are frequencies of radio waves used by the transceivers. Therefore, electromagnetic waves undergo multiple reflection by the plurality of substation machines 1201-1 to 1201-12 thereby to form a multiple wave interference environment.

In the present working example 12, since wireless transmission of high quality in which, under a multiple wave interference environment, a plurality of reflection waves are used to compensate for degradation of the communication quality can be implemented, control and monitoring of the substation machines 1201-1 to 1201-12 can be carried out remotely by a plurality of base station apparatus 1211a to 1211d using wireless connection means for which a transceiver is used according to the present technology without using wired connection means, the problem of high voltage inductive power that becomes a problem in the case where wired connection means such as a cable is used can be solved and the laying cost of a cable can be deleted. This is effective for improvement in safety and reduction cost of the controlling and monitoring system for the substation machines 1201-1 to 1201-12.

It is to be noted that any of the transmitters and the receivers in the working examples 1 to 10 described hereinabove can be applied to the base station transceivers 1203 and 1213.

Further, while the examples described hereinabove are configured such that a plurality of rotationally polarized waves are different in initial phase from each other but are same in frequency and rotational direction by the delay circuits $6_1$ to $6_m$ and $7_1$ to $7_m$, also it is possible to use another configuration in which a plurality of rotationally polarized waves are different in initial polarization from each other but are same in frequency and rotational direction.

DESCRIPTION OF REFERENCE CHARACTERS

1: Information signal generator
2: Rotational polarization frequency cosine wave generator
3: Rotational polarization frequency sine wave generator
4: Cosine-based switch
5: Sine-based switch
$6_1$ to $6_m$: Cosine-based delay circuit
$7_1$ to $7_m$: Sine-based delay circuit
$8_1$ to $8_n$: Cosine-based multiplier
$9_1$ to $9_n$: Sine-based multiplier
10: Transmission baseband circuit
11: Carrier wave generator
12: Cosine-based synthesis circuit
13: Sine-based synthesis circuit
14: Cosine-based carrier wave multiplier
15: Sine-based carrier wave multiplier
16: Second transmission cosine-based multiplier
17: Second transmission sine-based multiplier
18, 19: Polarization angle identification code generator
20: Reception baseband circuit
$21_1$ to $21_n$: Reception synthesis circuit
$22_1$ to $22_n$: Cosine weighting circuit
$23_1$ to $23_n$: Sine weighting circuit
24: Cosine-based local mixer
25: Sine-based local mixer
26: Local oscillator
31: First transmission antenna
32: Second transmission antenna
36: Second transmission cosine-based multiplier
37: Second transmission sine-based multiplier
38, 39: Polarization rotation period cyclic code generator
41: First reception antenna
42: Second reception antenna
$51_1$ to $51_n$: Synchronization code generation circuit
$52_1$ to $52_n$: Changeover circuit
53: Information signal division generator
$54_1$ to $54_n$: Information delay circuit
55: Digital serial to parallel conversion circuit
56: Second cosine-based switch
57: Second sine-based switch
$58_1$ to $58_N$: Transmission cosine weighting circuit
$59_1$ to $59_N$: Transmission sine weighting circuit
100: Wireless communication system
101, 102, 103, 104, 105, 106, 107, 108: Transmitter
201: Receiver
1100: Elevator system
1101: Building
1111: Lift cage
1102*a*, 1102*b*: Base station 2 orthogonal polarized wave integrated antenna
1103*a*, 1103*b*: Base station transceiver
1112*a*, 1112*b*: Terminal station 2 orthogonal polarized wave integrated antenna
1113: Terminal transceiver
1114: High frequency cable
1115: Elevator
1200: Substation equipment monitoring system
1201-1 to 1201-12: Substation machine
1202: Terminal station rotationally polarized wave antenna
1203: Terminal station transceiver
1211*a* to 1211*d*: Base station apparatus
1212: Base station rotationally polarized wave antenna
1213: Base station transceiver

What is claimed is:

1. A wireless communication system, comprising:
a transmitter including a rotationally polarized wave generation unit that generates a plurality of rotationally polarized waves, an information signal generation unit that generates a plurality of information signals, an origination unit that multiplies the rotationally polarized waves and the information signals and originates results of the multiplication as origination signals, and a state changeover switch that performs changeover between a wireless channel acquisition state in which one of the plurality of information signals is multiplied by one of the plurality of rotationally polarized waves and a result of the multiplication is originated and a normal transmission state in which the plurality of information signals are multiplied by the plurality of rotationally polarized waves and results of the multiplication are originated; and
a receiver including a reception unit that receives the origination signals from the transmitter, a weighting circuit unit that performs weighting for the signals received by the reception unit, and a reception baseband unit that regenerates the signals weighted by the weighting circuit unit into the information signals transmitted from the transmitter.

2. The wireless communication system according to claim 1, wherein
the transmitter multiplies, by the state changeover switch, one of the plurality of information signals by one of the plurality of rotationally polarized waves and originates resulting signals, and the receiver performs weighting for the received signals by the weighting circuit unit and regenerates the weighted signals into the information signals transmitted from the transmitter; and
the transmitter multiplies, when the wireless channel acquisition state is established by the state changeover switch, the plurality of information signals by the plurality of rotationally polarized waves to originate a plurality of information signals, and the receiver performs weighting of the plurality of received signals by the weighting circuit unit and reproduces the weighted signals using the information signals reproduced in the wireless channel acquisition state.

3. The wireless communication system according to claim 2, wherein
the weighting circuit unit of the receiver includes a plurality of weighting circuits that perform weighting for the received signals with a plurality of phase angles different from each other;
the transmitter multiplies, by the state changeover switch, one of the plurality of information signals by one of the plurality of rotationally polarized waves and originates the information signal, and the receiver performs weighting of the received signal with a plurality of phase angles different from each other and reproduces the weighted signals into the plurality of information signals transmitted from the transmitter; and the transmitter establishes the wireless channel acquisition state by the state changeover switch and multiplies the plurality of information signals by the plurality of rotational polarization waves such that a plurality of signals are originated, and the receiver reproduces the signals obtained by weighting the plurality of received signals by the plurality of weighting circuits using the plurality of information signals reproduced in the wireless channel acquisition state.

4. The wireless communication system according to claim 2, wherein the transmitter includes a polarization angle identification code generator that generates a code for dividing a polarization rotation period and superimposes a polarization angle identification code generated by the polarization angle identification code generator on the plurality of information signals, and the receiver separates the reception signals for each rotationally polarized wave used by the transmitter using the polarization angle identification code.

5. The wireless communication system according to claim 2, wherein the transmitter includes a polarization rotation period cyclic code generator that generates a cyclic code having a period equal to a polarization rotation period and superimposes a polarization rotation period cyclic code generated by the polarization rotation period cyclic code generator on the plurality of information signals, and the receiver separates the reception signals for each rotationally polarized wave used by the transmitter using the polarization rotation period cyclic code.

6. The wireless communication system according to claim 2, wherein the transmitter includes a polarization angle identification code generator that generates a code for dividing a polarization rotation period, a polarization rotation period cyclic code generator that generates a cyclic code of a period equal to the polarization rotation period, and a code changeover switch that performs changeover between the polarization angle identification code generator and the polarization rotation period cyclic code generator, and the polarization angle identification code generated by polarization angle identification code generator and the polarization rotation period cyclic code generated by the polarization rotation period cyclic code generator are changed over by the code changeover switch so as to be superimposed on the plurality of information signals, and the receiver separates the reception signals for each rotationally polarized wave used by the transmitter using the polarization angle identification code or the polarization rotation period cyclic code.

7. The wireless communication system according to claim 1, wherein the plurality of rotationally polarized waves generated by the rotationally polarized wave generation unit have initial phases different from each other and have a same frequency and a same direction of rotation.

8. The wireless communication system according to claim 1, wherein the plurality of rotationally polarized waves generated by the rotationally polarized wave generation unit have initial polarizations different from each other and have a same frequency and a same direction of rotation.

9. The wireless communication system according to claim 1, wherein the plurality of information signals generated by the information signal generation unit undergo delays different from each other.

10. The wireless communication system according to claim 1, wherein the plurality of information signals generated by the information signal generation unit are formed by time dividing an information signal.

11. The wireless communication system according to claim 1, wherein the state changeover switch performs changeover of the wireless channel acquisition state and the normal transmission state alternately in a period of time equal to an integer multiple of the polarization rotation period.

12. The wireless communication system according to claim 1, wherein the state changeover switch performs changeover between the wireless channel acquisition state and the normal transmission state such that the wireless channel acquisition state is executed in a period of time equal to an integer multiple of the polarization rotation period whereas the normal transmission state is executed in a period of time equal to an integer multiple of the polarization rotation period longer than the execution time period of the wireless channel acquisition state.

13. An elevator controlling system, comprising the wireless communication system according to claim 1.

14. A substation controlling system, comprising the wireless communication system according to claim 1.

* * * * *